Jan. 10, 1967 J. P. SCHMIEDEL ETAL 3,297,853
EMERGENCY BREAK-GLASS PUSHBUTTON
Filed Oct. 14, 1965 2 Sheets-Sheet 1

INVENTORS
James P. Schmiedel
BY Richard C. Rothweiler
John H. Leonard,
their ATTORNEY.

Jan. 10, 1967   J. P. SCHMIEDEL ETAL   3,297,853
EMERGENCY BREAK-GLASS PUSHBUTTON
Filed Oct. 14, 1965   2 Sheets-Sheet 2

INVENTORS.
James P. Schmiedel
BY Richard C. Rothweiler
John H. Leonard,
their ATTORNEY.

United States Patent Office 3,297,853
Patented Jan. 10, 1967

3,297,853
EMERGENCY BREAK-GLASS PUSHBUTTON
James P. Schmiedel and Richard C. Rothweiler, both of Wauwatosa, Wis., assignors to Square D Company, Park Rdige, Ill., a corporation of Michigan
Filed Oct. 14, 1965, Ser. No. 496,054
10 Claims. (Cl. 200—168)

This invention relates to emergency pushbutton switches of the type in which a lineally movable, spring returned, operator is held depressed from its normal extended position by a piece of glass and a member interposed between, and bearing against, the glass and the outer end of the operator in a manner such that the operator is released for return by its return spring to its normal extended position upon breaking of the glass.

The principal object of the invention is to provide a pushbutton switch operator which is held in depressed condition by a resilient member interposed between the outer end of the operator and a disc of glass, or of other readily breakable, rigid material, supported by the operator support.

A more specific object is to provide a pushbutton switch operator wherein the operator is mounted in a support for lineal movement in opposite directions and is resiliently urged to fully extended position by a return spring, a bezel is mounted on the support and supports a disc of glass in forwardly spaced relation from the outer end of the operator and constrains the disc from movement, relative to the bezel, away from the outer end of the operator, and a resilient spacer which has greater strength than the return spring of the operator is interposed between, and bears against, both the disc and the outer end of the operator and thereby holds the operator in depressed condition against the return force of the spring and the disc in position against the bezel.

Various other objects and advantages of the invention will become apparent from the following description wherein reference is made to the drawings in which, for purposes of illustration, the operator is shown as mounted on a horizontal panel, and in which.

Figure 1:
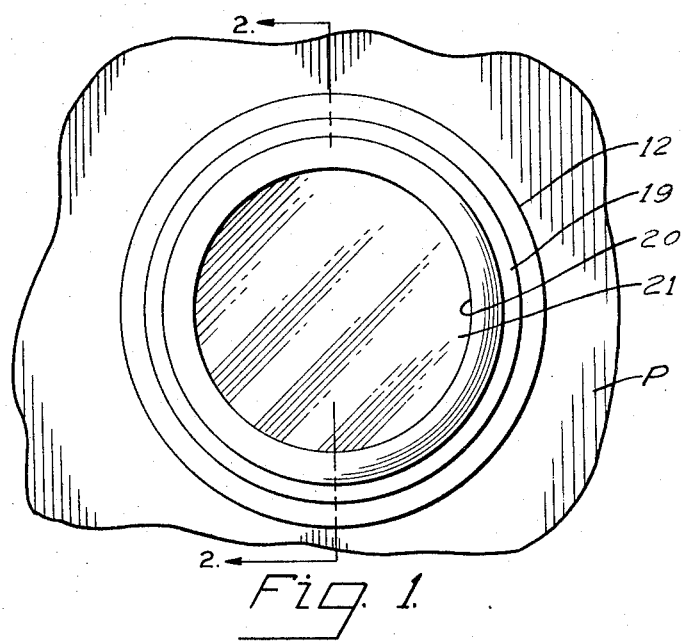
FIG. 1 is a top plan view of a fragment of a horizontal panel with a pushbutton operator and its support, embodying the principles of the present invention, mounted thereon.
Figure 2:
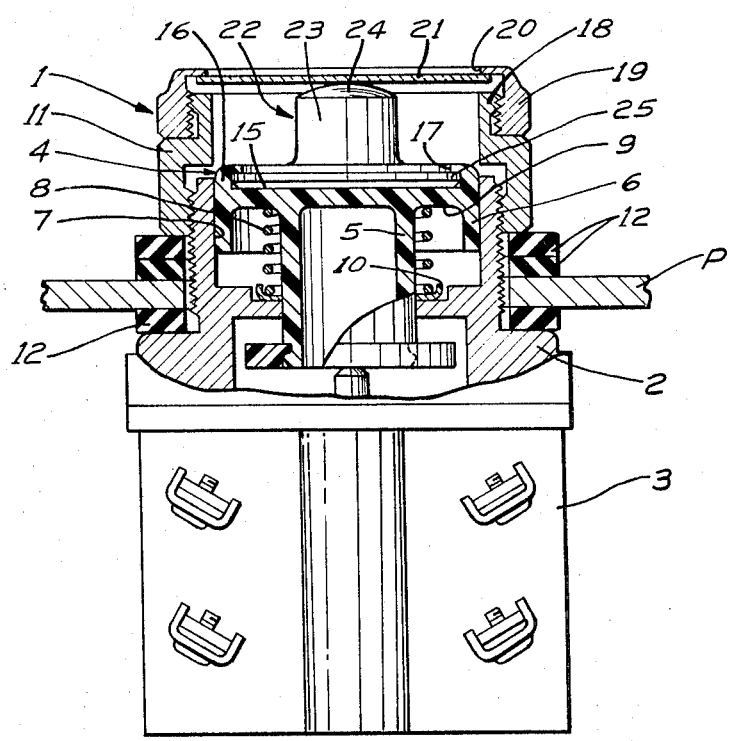
FIG. 2 is an enlarged sectional view of the structure illustrated in FIG. 1, and is taken on the line 2—2 of FIG. 1, part thereof and a switch contact block used in connection therewith, being shown in elevation for clearness in illustration.
Figure 3:
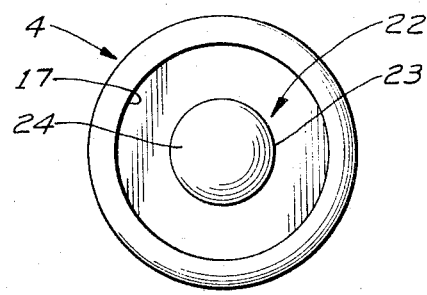
FIG. 3 is a top plan view of a resilient spacer forming part of the present invention, a portion of the operator being shown in connection therewith to illustrate the connection between the space and the outer end of the operator.
Figure 4:
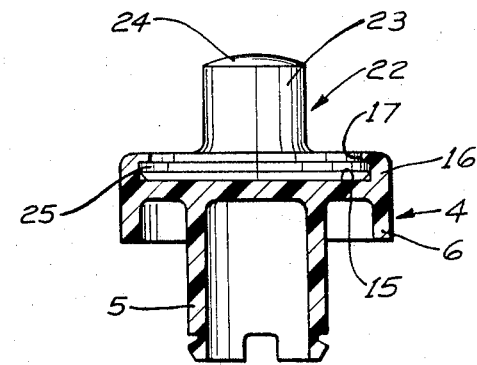
FIG. 4 is a front elevation, partly in section, of the structure shown in FIG. 3.

Referring first to FIGS. 1 through 4, a pushbutton switch operator assemblage, indicated generally at 1, is shown as mounted on a horizontal panel P.

The assemblage comprises an operator support in the form of a metal body or shell 2 to which is connected the usual contactor switch block 3 which includes a switch mechanism, the contacts of which are operated by plungers which, in turn, are operated by the operator of the present assemblage.

The operator assemblage, shown for purposes of illustration, may be one such as disclosed in the copending application of Turnbull, Bierenfeld, and Sohns, Ser. No. 453,410, filed May 5, 1965, and entitled "Push Button Operated Switch Structure," and in U.S. Patent No. 3,154,661, issued October 27, 1964, and entitled "Insert for a Switch Button."

As therein shown and more fully described, the operator itself comprises an enlarged head 4 having a coaxial operating stem 5. The head 4 has an outer cylindrical flange 6, the outer peripheral surface of which is guided for axial movement by an inner wall portion 7 of the shell 2.

A return spring 8 is seated at one end against the underside of the head, as indicated at 9. At its other or lower end, the spring 8 is seated against a retainer disc 10 which is slidable axially relative to the stem 5 and is seated on an upwardly facing shoulder in the shell or body 2. The spring 8 urges of the operator upwardly to a fully extended position when the operator is released. The support or shell 2 extends through a suitable passage in the panel P and is clamped in place by a suitable hold-down ring nut 11. Suitable washers 12 are interposed between the panel P and the support 2 and ring nut 11, respectively. The block 3 is connected by the lower end of the operator support 2.

The head 4 of the operator has a forwardly facing front wall 15 and a forwardly extending peripheral flange 16 which may be a forward continuation of the guiding flange 6 of the head. At its forward end, the flange 16 carries an inwardly extending flange 17 in forwardly spaced overhanging relation to the front wall 15. The wall 15, together with the flange 17, defines a forwardly open cavity.

In the above referred to Patent No. 3,154,661, the cavity thus provided was to receive a relatively stiff, resilient insert, such as organic plastic, generally in the form of a flat disc or plate, either colored or carrying indicia to distinguish the particular operator from others of a group on the panel.

The structure thus far described is known in the art.

In accordance with the present invention, the ring nut 11 is modified by providing a forward annular extension 18 which preferably has an internal diameter about equal to that of the flange 6 of the head 4 so as to accommodate the head 4 with radial operating clearance as the operator is moved forwardly to extended position and rearwardly to depressed position. The annular extension 18 is externally threaded to receive an internally threaded ring nut 19 which has an inwardly projecting radial flange 20, which, when the ring nut 19 is fully installed, is spaced upwardly or forwardly from the outer end of the extension 18 in overhanging relation thereto. The ring nut 19 and flange 20 thus provide a bezel having a window or frame opening aligned with the head 4 of the operator.

Disposed between the flange 20 and the outer end of the extension 18 is a disc 21 of glass or of other brittle, readily breakable material. The disc 21 preferably entirely closes the opening defined by the inner periphery of the flange 20. The thickness of the disc 21 preferably is less than the distance between the flange 20 and the outer end of the extension 18 so that the disc is not clamped between the flange 20 and outer end of the extension 18, but is free to float slightly axially of the operator.

Interposed between the inner or lower face of the disc 21 and the forward or upper end of the operator are resilient spacer means which have a greater resistance value or strength than that of the return spring 8, so that, when the disc 21 and the ring nut 19 are installed, the resilient means are compressed sufficiently so as both to hold the operator depressed against the force of the return spring 8 and the disc yieldably against the lower or inner face of the flange 20.

In the form illustrated, this resilient spacer means comprises a spacer 22 of set resilient organic material such, for example, as neoprene of 30 durometer. The strength of the spacer is greater than that of the return spring 8 and sufficient to overcome the spring 8 and push the pushbutton to depressed position and hold the glass disc 21 in position against the rear or lower face of the flange 20.

The spacer 22 preferably is in the form of a hollow cylindrical portion 23, rounded at its upper end, as indicated at 24, and terminating at its lower end in an outwardly extending peripheral flange 25. The flange 25 is sufficiently stiff and has such a shape that it can be snapped into the forwardly open cavity in the front end of the head 4, with its margin disposed between the flange 17 and front wall 15 of the head 4, and thus be held centered in proper relation to the head 4 and disc 21.

The strength of the spacer 22, when compressed for holding the operator depressed, is preferably such that upon breaking of the disc, it will cause the fragments of the disc to be pushed out of the opening in the ring nut 19 sufficiently to permit the operator to be moved forwardly to its extended position by its return spring 8, and thus cause operation of the associated switch. It has insufficient strength, however, to cause the fragments to be ejected forwardly appreciably from the forward or upper end of the ring nut 19 and to splatter sufficiently forcibly so as to be apt to endanger the person who breaks the disc 21.

Thus, upon pushing down the operator, and installing the ring nut 19 with the disc 21 and spacer 22 in place, the operator is held in depressed condition until such time as the disc is removed, either by breaking or removing the ring nut 19.

Due to the axial clearance between the installed disc 21 and the outer end of the extension 18, and the yieldable retention of the disc 21 against the lower face of the flange 20 by the spacer 22, dimensional precision in disc thickness and spacing of the flange 20 from the lower end of the ring nut 19 is not required. Likewise, expansion and contraction of the parts axially of the operator are compensated without interferring with the operation.

Figure 5:
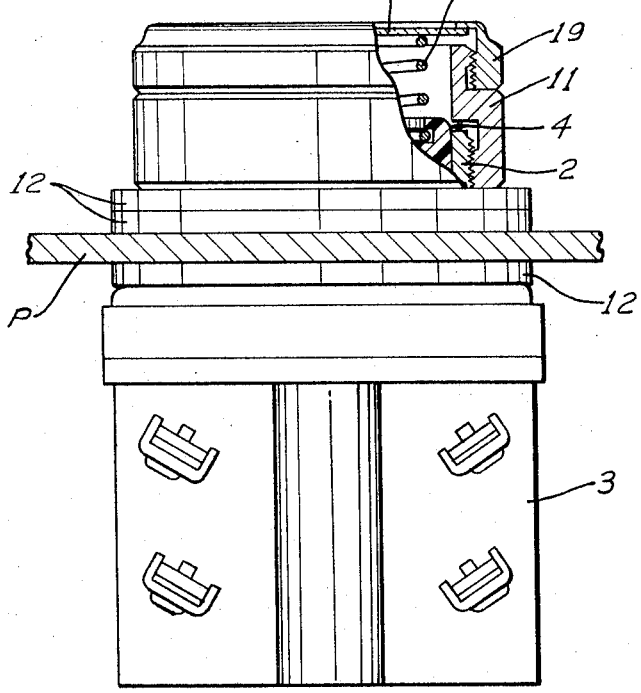
FIG. 5 is a view similar to FIG. 2, partly in section, illustrating a modified form of the invention.

A modification of the invention is shown in FIG. 5 wherein, instead of the resilient spacer 22, a spring 26 is interposed between the disc and head of the operator, the spring 26 being slightly stronger than the spring 8. The spacer 22 is preferred, however, because a spacer such as spring 26 tends to eject the disc fragments too forcibly, especially if all of the spring strength is directed against only one or two small fragments, and thereby endangers personnel. Furthermore, a spring may itself escape through the opening with the fragments and strike the eyes or face of a person breaking the disc.

It is apparent from the description that this emergency break-glass type of structure is readily adaptable to various pushbutton operated switches, such as described in the above patent and copending application.

Having thus described our invention, we claim:

1. A pushbutton switch operator assemblage comprising a support,
    a pushbutton operator mounted in the support for movement in opposite directions,
    a return spring urging the operator in one of said directions from a depressed to an extended position,
    a readily breakable rigid member,
    means supporting the member and constraining the member from movement in at least one direction relative to said support,
    resilient spacer means in compressed condition bearing against the member and the operator and having, when in said condition, greater strength than the return spring, and resiliently holding the operator in depressed position against the force of the return spring while urging said member in said one direction relative to the support.

2. The structure according to claim 1 wherein the operator is supported in its support for lineal movement forwardly to its extended position and rearwardly to its depressed position;
    the member is supported with a rearwardly facing surface in forwardly spaced relation to a forwardly facing surface of the operator, and
    the spacer means bears against the rearwardly facing surface of the member and the forwardly facing surface of the operator.

3. The structure according to claim 2 wherein the lineal movement of the operator is axially of the operator, the member is a disc of readily breakable material and is coaxial with and spaced forwardly of, the operator, and the spacer means bears against the rear of the disc and front of the operator.

4. The structure according to claim 1 wherein the spacer means is composed of set resilient organic plastic material.

5. The structure according to claim 1 wherein the spacer means is a spring.

6. The structure according to claim 1 wherein the operator has a cavity with a slightly restricted end opening facing in said one direction,
    the resilient spacer means has a resilient flange normally of too great a diameter to be received through the opening when the flange is undistorted, but receivable in distorted condition through the opening, and
    said flange is accommodated in the cavity and thereby connects the spacer means to the operator.

7. The structure according to claim 6 wherein the flange bears against the operator, and the spacer means has a stem portion integral with the flange and bearing against the member.

8. A pushbutton switch operator assemblage comprising a support,
    a pushbutton operator mounted in the support for axial movement forwardly and rearwardly relative thereto,
    a return spring urging the operator forwardly from a depressed to an extended position,
    a disc of readily breakable rigid material,
    connecting means on the support supporting the disc in forwardly spaced alignment with the operator and constraining the disc from movement forwardly relative to said support,
    resilient spacer means in compressed condition, bearing against the rear of the disc and front of the operator, and having, when in said condition, greater strength than the return spring, and resiliently holding the operator in depressed position against the force of the return spring.

9. The structure according to claim 8 wherein the connecting means has a rearwardly facing surface engaging the margin of the disc at the forward face of the disc, and the support has a forwardly facing surface facing toward, and spaced rearwardly from, the margin of the disc at the rear face of the disc.

10. The structure according to claim 8 wherein the support has an annular peripheral wall defining a passage extending forward and rearwardly of the path of the operator, the operator has a forward head portion in, and coaxial with, the passage,
    said wall has a portion which extends forwardly beyond the forward end of the head portion and which is externally threaded,
    a ring nut is in threaded engagement with the threaded portion of the wall and has a radially inwardly projecting flange at its outer end overhanging the forward end of the wall in forwardly spaced relation, and
    the disc is between, and has its margin aligned with, said flange and forward end of the wall, and is of less thickness than the distance between said flange and forward end of the wall.

No references cited.

ROBERT K. SCHAEFER, *Primary Examiner.*

H. O. JONES, *Assistant Examiner.*